United States Patent [19]

Baumann et al.

[11] 4,294,014
[45] Oct. 13, 1981

[54] APPARATUS FOR DETERMINING THE SHOE SIZE CORRESPONDING TO A FOOT

[75] Inventors: Dieter Baumann, Leun-Stockhausen, Fed. Rep. of Germany; Pierre Bidegain, Pau, France

[73] Assignee: Bidegain S.A., Pau, France

[21] Appl. No.: 134,633

[22] Filed: Mar. 27, 1980

[30] Foreign Application Priority Data

Mar. 27, 1979 [DE] Fed. Rep. of Germany ....... 2912038

[51] Int. Cl.³ .............................................. A43D 1/02
[52] U.S. Cl. ........................................ 33/3 C; 33/3 B
[58] Field of Search .................... 33/3 C, 3 B, 3 R, 4, 33/6

[56] References Cited

U.S. PATENT DOCUMENTS 3,066,417 12/1962 Samuels ................................. 33/3 C
3,328,882 7/1967 Blivice .................................. 33/3 C
4,190,959 3/1980 Darvin .................................. 33/3 B

FOREIGN PATENT DOCUMENTS 1489181 10/1977 United Kingdom ................. 33/3 C Primary Examiner—Willis Little
Attorney, Agent, or Firm—Darby & Darby

[57] ABSTRACT

The invention relates to an apparatus for determining shoe size by examination of a foot, which device is portable, consumes relatively little energy and is entirely free of mechanical components. The apparatus is of the type in which radiant energy emitters and radiant energy sensors are provided is opposed, spaced relationship and measurement is achieved by interposing the foot therebetween. Discrete emitters and sensors are provided along the length and width of the foot in dedicated emitter/sensor pairs which are spaced from other such pairs by a distance not exceeding the dimensional difference between consecutive shoe sizes. In various embodiments, correlation is maintained between emitter/sensor pairs through spatial arrangement, time division, multiplexing and combinations thereof, as well as through diverse modulation. At the same time, correlation between adjacent pairs is kept low to avoid cross-interference effects.

38 Claims, 7 Drawing Figures

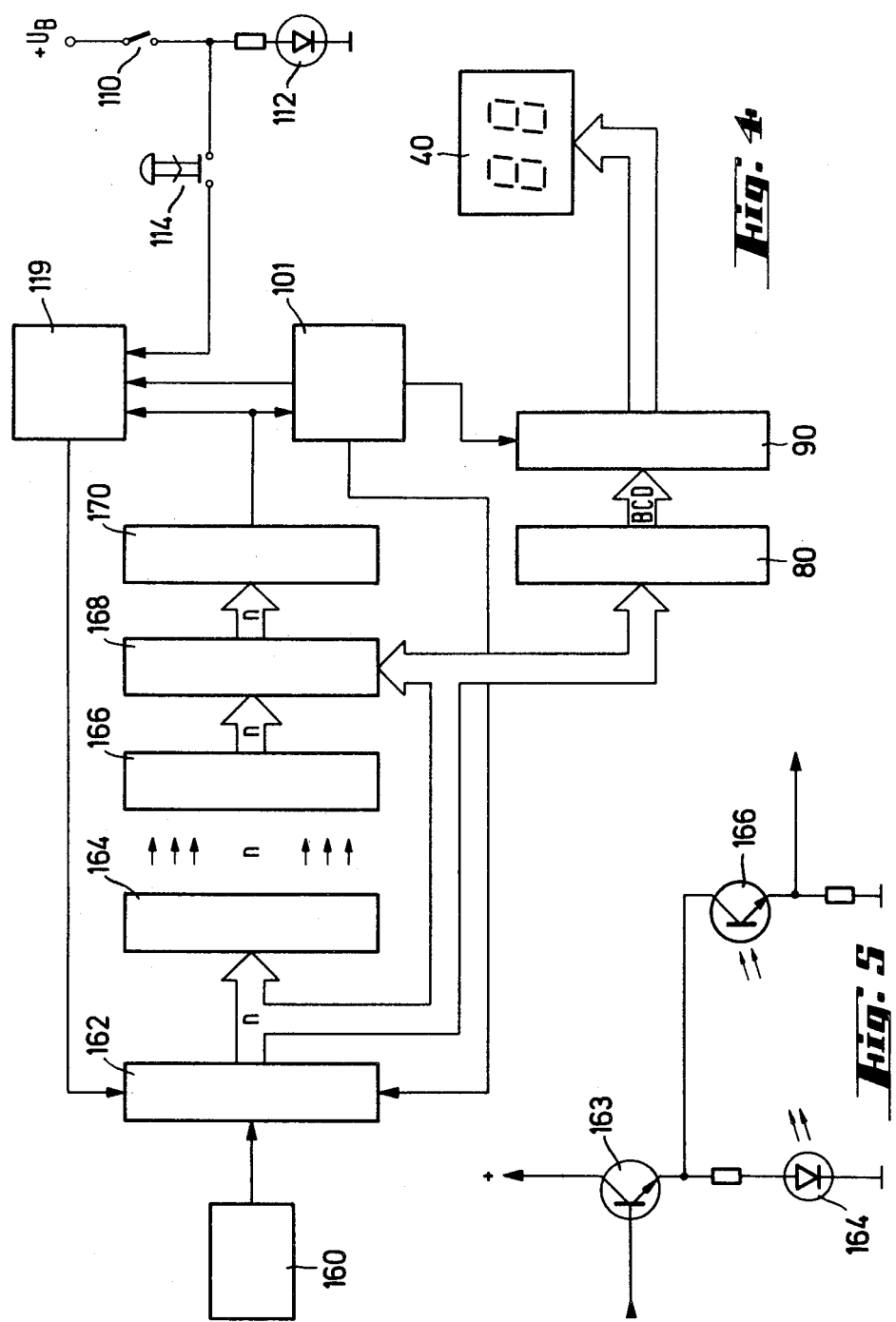

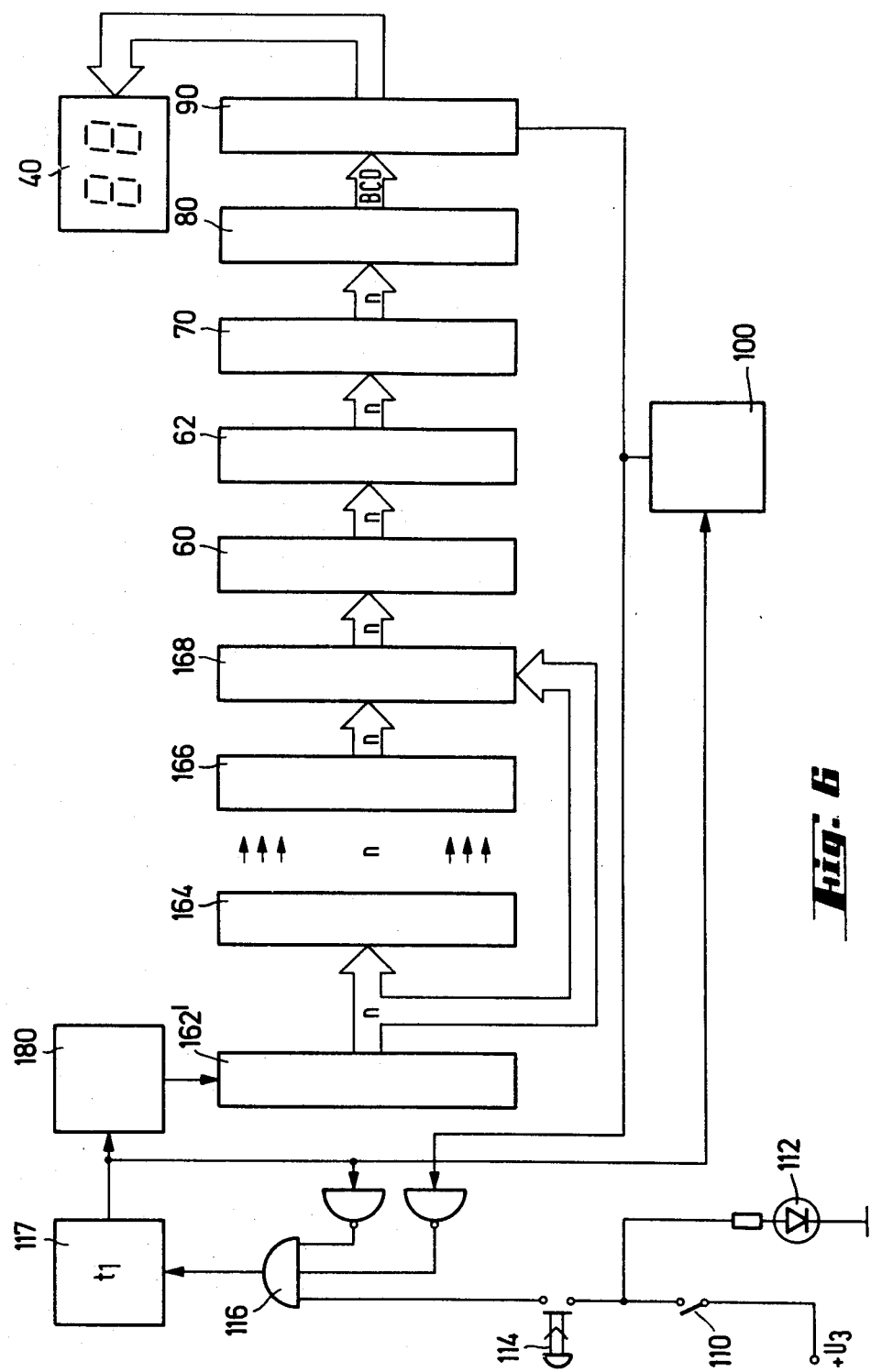

APPARATUS FOR DETERMINING THE SHOE SIZE CORRESPONDING TO A FOOT

The present invention relates to an apparatus for determining the shoe size corresponding to a foot, with a foot holding device and at least one transmitting unit radiating bunched signals to a receiving unit arranged opposite the latter, where the transmitting unit can be subdivided into radiating basic elements and into basic elements responding to the signals, and that the pairs of basic elements formed of opposing basic elements are arranged side by side in the direction of successive measuring raster points.

Such an apparatus is known, for example, in cabinet form as a shoe size measuring device where photoelectric cells arranged laterally of the footboard scan the foot width and the length in a raster. From U.S. Pat. No. 3,328,882 it is known to improve such a shoe size measuring device in cabinet form particularly to simplify it in such a way, that it is suitable for operation in self-service stores, always determine exactly measured values regardless of the shape of the foot, and displays them automatically in the form of the necessary shoe length and/or width in a visual display. The length and/or width of a human foot is measured with rays or freely propagating waves guided parallel to the surface of the footboard and transverse to the longitudinal and/or lateral direction of the footboard. The type of rays is selected so that the rays cannot penetrate through the tissue of the human foot. The rays are radiated by a transmitting unit, arranged along a longitudinal and/or transverse edge of the footboard, to a receiving unit arranged along the opposite edge. The transmitting unit consist here of at least one radiation source extending in the longitudinal and/or lateral direction of the footboard, with a subsequent collecting lens which focuses the emitted rays parallel to the surface of the footboard. The receiving unit consists substantially of several radiation sensitive receivers arranged side by side in the longitudinal or lateral direction of the footboard.

The radiation source(s) and the radiation-sensitive receivers correspond to the basic elements of an arrangement of this type. The number of radiation-sensitive receivers is determined by the spacing between them. The spacing, in turn, depends on the standard shoe length and/or shoe width measuring intervals of measuring rasters. The foot length and/or width is determined by determining the number of radiation-sensitive receivers shaded or not shaded by the foot and is displayed by means of electronic converting elements on an indicator board in the form of standardizedshoe length or width values. The indicator board is connected over a column with the basic unit containing the foot holding device. The shoe size measuring device known from U.S. Pat. No. 3,328,882 has the disadvantage that the electronic converting elements are rather complicated. Besides, the accuracy of the measured values still depends on the shape of the foot; it also depends particularly on whether the right or left foot is measured.

U.S. Pat. No. 3,457,647 teaches that the known automatic shoe size measuring device known from U.S. Pat. No. 3,328,882 be improved in such a way that its design is simplified while obtaining a high measuring accuracy and, at the same time, reducing the number of radiation receivers or radiation sources required. This problem is solved in the above-mentioned patent, in an otherwise identical arrangement, by providing only one basic element comprising a receiving unit which can be moved back and forth in the direction of the longitudnal and/or lateral edge of the footboard by means of a lead screw and a motor. The basic element is arranged on the lead screw which, during its movement in the direction of the longitudinal edge of the footboard, comes in contact successively with individual contacts spaced at a distance equal to the provided measuring raster interval. This arrangement has the same measuring errors as the arrangement known from U.S. Pat. No. 3,328,882.

Another disadvantage is that it has parts that wear mechanically and consumes relatively great energy in the driving motors. Because of the last mentioned drawback, this shoe size measuring arrangement is not suitable for line-independent and portable operation.

British Pat. No. 1,489,181 addresses the problem of developing a device for measuring a human foot in such a way that it permits automatic accurate measurement of the length and/or width of the foot without the use of mechanical gauges. This problem is solved in that the footboard is transparent, that a light source is arranged above the footboard, that a first stirrup is disposed under the footboard to extend in the direction of one edge of the footboard and be displaceable transverse to this edge, and that under the first stirrup a second stirrup extends parallel to the direction of displacement of this stirrup. Both stirrups are equipped with photoelectric cells whose spacing is determined by the standard intervals for the shoe length and shoe width and the measuring raster respectively. The movable stirrup can be moved by means of an electromotor. One foot dimension (width) is measured by moving the movable stirrup under the foot and along it, so that the photoelectric cells are shaded against the light radiated from the top depending on the shape of the foot, the maximum number of the shaded and/or unshaded photoelectric cells being determined and indicated on an indicator board as a standardized shoe dimension (width). The other foot dimension (length) is measured by determining the first photoelectric cell of the stationary stirrup which receives no light simultaneously with at least one photoelectric cell of the movable stirrup. The photoelectric cells of the stantionary stirrup are thus shaded successively by the movable stirrup against the incident light from the top. In this shoe size measuring arrangement too, the measurements made with the photoelectric cells arranged on the movable stirrup in one foot dimension (width) are relatively inaccurate. Since the measurement of the other foot dimension (length) depends on that made by means of the movable stirrup, the measuring inaccuracy of the movable stirrup is necessarily transferred to the stationary stirrup. Furthermore, the shoe size measuring arrangement has the drawback that it has parts that wear mechanically and that great energy is consumed in the driving motor.

The primary object of the invention is to improve an arrangement of the above described type in such a way that its measuring accuracy is increased while maintaining, as far as possible, the advantages of the known shoe size measuring devices.

This object is achieved by positioning the radiating areas of the individual basic elements, and of those responding to the signals, so that their extension in the direction of successive measuring raster points is smaller than or equal to the spacing between adjacent measuring raster points. In addition, the two basic elements associated with each pair of basic elements, at least within adjacent pairs of basic elements, are correlated one-to-one with each other (reversibly unique or injective) with regard to the transmitted signals.

During these measures, the measuring inaccuracies of the known shoe size measuring devices are at least substantially eliminated, because, due to the area limitation of the basic elements to the spacing of directly adjoining measuring raster points and the one-to-one relationship of correlated basic elements regarding the transmitted signals, the measuring inaccuracy of the known shoe size measuring device which results from geometric-optical considerations is eliminated. In the known shoe size measuring devices, several basic elements at the receiver end receive radiation from the basic element at the transmitter end, owing to the divergence of the rays within the radiation plane. This is thus a unique correlation between the basic elements at the transmitter and at the receiver end, wich can result in an apparent increase or reduction of the foot length and/or width.

Furthermore, the measuring inaccuracies of the known shoe size measuring devices resulting from the nature of the waves of radiation are also practically completely eliminated. Accordingly to Huygen's principle, each point of a wave zone can be considered the starting point of a spherical or circular wave. Any obstacle in the path of the wave propagation causes diffraction and thus a deviation from the rectilinear course of the rays. The feet represent such an obstacle in the known shoe size measuring devices; they therefore produce diffractions which, in the known shoe size measuring device, do not permit a unique correlation between the basic elements at the transmitter and receiver end. The diffraction phenomena—just as the above mentioned geometric-optical measuring errors—result in an apparent increase or reduction of the foot length and/or width. This leads to wrong displays on the indicator board, the error depending in turn on the respective shape of the foot, particularly on whether the right or left foot is measured, because in the known shoe size measuring device, one of the feet is always farther from the basic elements at the transmitter end than the other foot. It is a feature of the present invention, that adjacent pairs of basic elements are prevented from influencing each other, whereby systematic measuring errors are avoided. With this feature of the present invention it is thus possible to realize an arrangement with individual clearly distinguishable signal barriers with the raster spacing of the available shoe sizes.

The basic elements at the transmitter end preferably have radiation-emitting diodes, and the basic elements at the receiver end photo-transistors. Radiation and particularly light-emitting diodes and phototransistors are particularly simple elements and are easy to control.

When the shoe size is determined by the length of the foot, a first transmitting and receiving unit is provided which extends in the longitudinal direction of the foot-holding range. If the shoe size is determined by the foot length and/or foot width, a second transmitting-and receiving unit is provided which extends in the lateral direction of the foot-holding range. Measurement of the foot length is particularly important for children's shoes, since great fluctuations of the foot width, relative to the foot length appear particularly in children's feet, and an overly tight shoe can lead to permanent damage, due to the relatively soft bones in children. Though the measuring raster must be applied particularly closely spaced to measure foot width, and the signals are transmitted over relatively long distances, this measurement is extremely accurate because of the features of the invention. For the simultaneous measurement of both feet, the second transmitting-and receiving unit extends over a length which is at least twice the width-measuring raster. Furthermore, a comparator circuit is provided in this case which transmits only the larger of the two measured width values.

A particularly simple measuring possibility of the measured value exists in that the basic elements at the receiver end are connected to a visual display. Preferably a device for converting the output signals of the basic elements into shoe size values is arranged between the visual display and the outputs of the basic elements at the receiver end, so that the necessary shoe size can be read directly without any conversions. Particularly suitable for converting the output signals of the basic elements to shoe size values is s BCD-converter.

For indicating shoe size values which take into account both the length and the width, a common matrix circuit is preferably arranged in rear position to the first and second receiving units, whose line control is connected to the outputs of the basic elements of one receiving unit and whose column control is connected to the outputs of the basic elements of the other receiving unit. A size corresponds to each matrix intersection, so that the controlled matrix intersection can be translated or converted to a shoe size by suitable converting elements, for example, the above-mentioned BCD-converter. Particularly suitable as a matrix circuit is a diode matrix, especially a storage matrix. The above-mentioned one-to-one correlation between the basic elements can be achieved in the simplest case by providing corresponding transmitting and receiving units with exactly one basic element, and arranging the basic elements for synchronous displacement in the same direction. The limitation of the measuring channel to the spacing between the measuring raster points is ensured by the corresponding limitation of the surfaces of the basic elements facing each other. There is no mutual influences of adjoining measuring channels, because there is only one active measuring channel. This measuring channel is correlated successively by displacement with the individual raster points. Due to this feature, only a minimum number of basic elements is required.

In order to be able to scan several measuring rasters simultaneously in view of a transmitting-and associated receiving unit, and to avoid mechanical displacement of the basic elements, and thus to save energy, the transmitting and receiving units each have several basic elements arranged side by side in a row. Preferably both, namely the first and second transmitting-and receiving unit have several basic elements arranged side by side in a row. Measurement is particularly simple if the intervals of the basic elements at the transmitter end are equal to those at the receiver end. The measurement and the electronic layout are particularly simple if the intervals of the basic elements of the first transmitting-and receiving unit are equal to the intervals between the corresponding shoe length values, and the intervals of the basic elements of the second transmitting and receiving unit are equal to the intervals between the corresponding shoe width values.

The indicated one-to-one correlation of the basic elements can preferably be achieved by making at least adjacent pairs of basic elements distinguishable by the type of radiation transmitted between them. For example, only electromagnetic radiation can be transmitted with one pair of basic elements and only ultrasound radiation with the other pair. If it is preferred to design reasons to always transmit the same type of radiation between the basic elements, the one-to-one correlation can preferably be achieved by making at least adjacent pairs of basic elements differ from each other by the frequency of the radiation transmitted between them, where one pair of basic elements transmits, for example, in the optically visible range, and the other pair of basic elements in the optically invisible range. Particularly preferred is the one-to-one correlation and/or the clear distinguishability between the measuring channels where pairs of basic elements are selected which differ from each other at least in their immediate poximity by the modulation of the radiation transmitted between them.

In order to further increase the measuring accuracy, as far as diffraction effects are concerned, the basic elements are so designed that at least adjacent pairs of basic elements differ from each other by the transmittable polarization of the radiation between them, because their direction of polarization is at least partly changed in a diffraction of the rays by the foot.

The one-to-one correlation between the basic elements can be achieved by assigning a device to each pair of basic elements which focusses the radiation transmitted by the basic element on a cross section whose extension in the direction of successive measuring raster points is smaller than the spacing between adjacent measuring raster points.

According to a preferred embodiment, the one-to-one correlation between the basic elements is achieved by providing a time multiplexer which clocks at least adjacent pairs of basic elements at different times. This feature ensures that adjacent pairs of basic elements do not transmit rays or signal simultaneously. For this reason, interaction between the signals of adjacent pairs of basic elements is impossible.

The use of optical radiators, for example, light-emitting diodes, as basic elements at the transmitter end has the advantage that such elements are particularly simple and easy to control. The same holds true for the use of basic elements at the receiver end responding to optical radiation, for example, phototransistors. The use of basic elements which transmit electromagnetic radiation in the optical or near-optical range has the advantage that damage to the foot tissue is practically impossible.

The basic elements of adjacent pairs of basic elements can be correlated in a one-to-one relationship by directly laying out the basic elements for the emission or reception of a defined optical radiation. Instead, a pair of filters can be assigned to each pair of basic elements, which ensures the selectivity of the transmittable light. Preferably the pair of filters is designed as a pair of frequency filters, e.g. in the form of two correlated interference filters, of which one pair transmits only the red portion of the spectrum, and the other only the blue portion of the spectrum. The pair of filters can also be designed as a pair of polarization filters, e.g. as a pair of filters for the linear, elliptical or circular polarization. In order to ensure a clear separation of adjacent pairs of basic elements in linear polarization, adjacent pairs of filters must be displaced in their direction of polarization by 90 deg. each, that is, they must be able to emit or receiver alternately horizontally and vertically polarized light. Preferably the pair of filters is a pair of modulation filters designed so that the light is modulated with a certain frequency at the transmitter end, and that only light of the desired modulation is transmitted at the receiver end by means of a suitable filter arrangement.

Principally, a sufficient channel separation or separation of two adjacent pairs of basic elements can be achieved with two different types of filter pairs by the alternating arrangement of the two different types of filter pairs. The selectivity is increased by assigning a total of three different types of filter pairs, particularly modulation filter pairs, alternatingly to the basic elements.

In order to reduce the engineering efforts regarding the modulation filter units of the types of modulation filter pairs arranged at the transistor end, identically designed modulation filter units are combined in to a unit at the transmitter end.

Particularly sharp distinguishability of adjacent pairs of basic elements is achieved in the first transmitting- and receiving unit by assigning to each pair of basic elements a pair of modulation filters which differs from all other modulation filter pairs of this transmitting-and receiving unit. The same holds true for the second transmitting-and receiving unit.

According to a preferred embodiment for a measuring arrangement using modulated light, each pair of modulation filters has a pulse shaper preceding the basic element at the transmitter end, and an oscillator preceding the pulse shaper. In this embodiment, each pair of modulation filters preferably has a comparator following the basic elements at the receiver end, one input of the comparator being connected to the output of the basic element at the receiver end and the other input being connected to the output of the pulse shaper. The comparator transmits a signal received from the receiver only when the modulation frequencies emitted at the receiver end and the pulse shaper end coincide.

With n pairs of basic elements, each equipped with 1 pair of modulation filters, it becomes necessary to determine that pair of basic elements between which the measuring signal has been transmitted which is necessary for the determination of the required shoe size. For this purpose, two exclusive OR-gate basic element at the receiver end is followed by such a way that the basic element controls exactly one output of each exclusive OR-element, and the other two inputs are controlled by the basic elements arranged at both sides of the basic elements.

This arrangement assures that exactly the pair of basic elements which is at the threshold between the region shaded by the foot and by the unshaded region can be clearly determined in a particularly simple manner.

The selectivity between the pairs of basic elements is further increased by preceding each exclusive OR-gate with threshold switch and preceding the threshold switch with an integrator. As a result, interferences by outside light and possibly harmonics of the modulation frequency are practically impossible. A further improvement to eliminate interferences can be achieved by a time switch, which limits to a given finite number in excess of 2 the number of pulses emitted by the oscillator per measurement. Also, a resistor is connected in parallel with the integrator whose resistance value is so selected that the integrator emits a signal exceeding the threshold value only when it receives the given finite number of pulses.

If a shoe size value depending on the foot length and width is desired, it is advantageous to connect the outputs of the exclusive OR-gate with the line and column control of the matrix circuit and to have the visual display controlled by the matrix circuit, preferably over a BCD-7-segment decorder-driver stage.

The sequence of the pulses emitted by the pulse shaper, that is, the modulation frequency, can be set exactly by arranging a square wave oscillator at the transmitter end, providing a differential element between the square wave oscillator and the pulse shaper, and having a base-controlled switching transistor between the pulse shaper and the light-remitting diode.

A particularly simple realization of the comparator for determining the coincidence of the received modulation frequency given off by the pulse shaper is obtained by a NOR-gate having one input connected to the output of the pulse shaper, and the other input connected to the output of the basic element at the receiver end. A Schmitt trigger as a threshold switch topped by the integrator is preferably used.

According to a preferred embodiment of the arrangement according to the invention for the time multiplex operation, a clock oscillator and subsequent counter having at least two successively charged outputs are provided where the two control inputs for the basic element of a pair of basic elements at the transmitter-and receiver end are connected to the same counter output, and the control inputs of directly juxtaposed pairs of basic elements are connected to different counter outputs. Preferably, the counter outputs are correlated with the pairs of basic elements in a one-to-one relationship, that is, to each counter output is assigned exactly one pair of basic elements and to each pair of basic elements only this one counter output.

For indicating shoe size values in dependence on the foot length and/or width, the counter outputs of the first transmitting-and receiving unit are connected to the line control, in the arrangement according to the invention, for time multiplex operation and to the counter outputs of the second transmitting and receiving unit are connected to the column control of the matrix circuit. Furthermore, a device for marking those counter outputs which are correlated with the two determined shoe size values is provided for each counter. In an arrangement with n pairs of basic elements, which are clocked in the direction of rising measuring raster points, the device for marking those counter outputs which are correlated with the two determined shoe size values preferably has an n-input OR-gate following the n basic elements at the receiver end, the output of which is connected to the counter over a switch gate. The output signal of the Or-gate at the threshold between shaded and unshaded region triggers the switch gate, which then shuts off the counter.

The advantages of the time multiplexer operation regarding channel separation, and the advantages of the operation with modulated light regarding the susceptibility to interference pulses and outside light can be achieved together by arranging two EXCLUSIVE OR-gates in rear position to each basic element at the receiver end in an embodiment of the invention adapted for time multiplex operation. This is done in such a way that the basic element controls only one input of each EXCLUSIVE OR-gate the other two inputs being controlled by the basic elements arranged at both sides of the basic element, and that preferably each EXCLUSIVE OR-gate is topped by a threshold switch and the latter by an integrator. Preferably, a time switch is also provided which limits the number of pulses given off by the oscillator per measuring channel or measurement to a given finite number over 2, when a resistor is connected in parallel to the integrator, whose resistance value is so selected that the integrator emits a signal exceeding the threshold value only when the given finite number of pulses is received. Accordingly, the counter is passed through twice completely in this design.

The invention will be described more fully on the basis of the following embodiments and the attached schematic graphic representations.

FIG. 4 shows the block circuit diagram of an embodiment for time multiplex operation of the arrangement;

FIG. 5 shows a logic schematic circuit diagram of the light barrier according to FIG. 3 determined by a pair of basic elements;

FIG. 6 shows a block circuit diagram of an embodiment for the design of the arrangement for integrated time multiplex operation.

Figure 1:
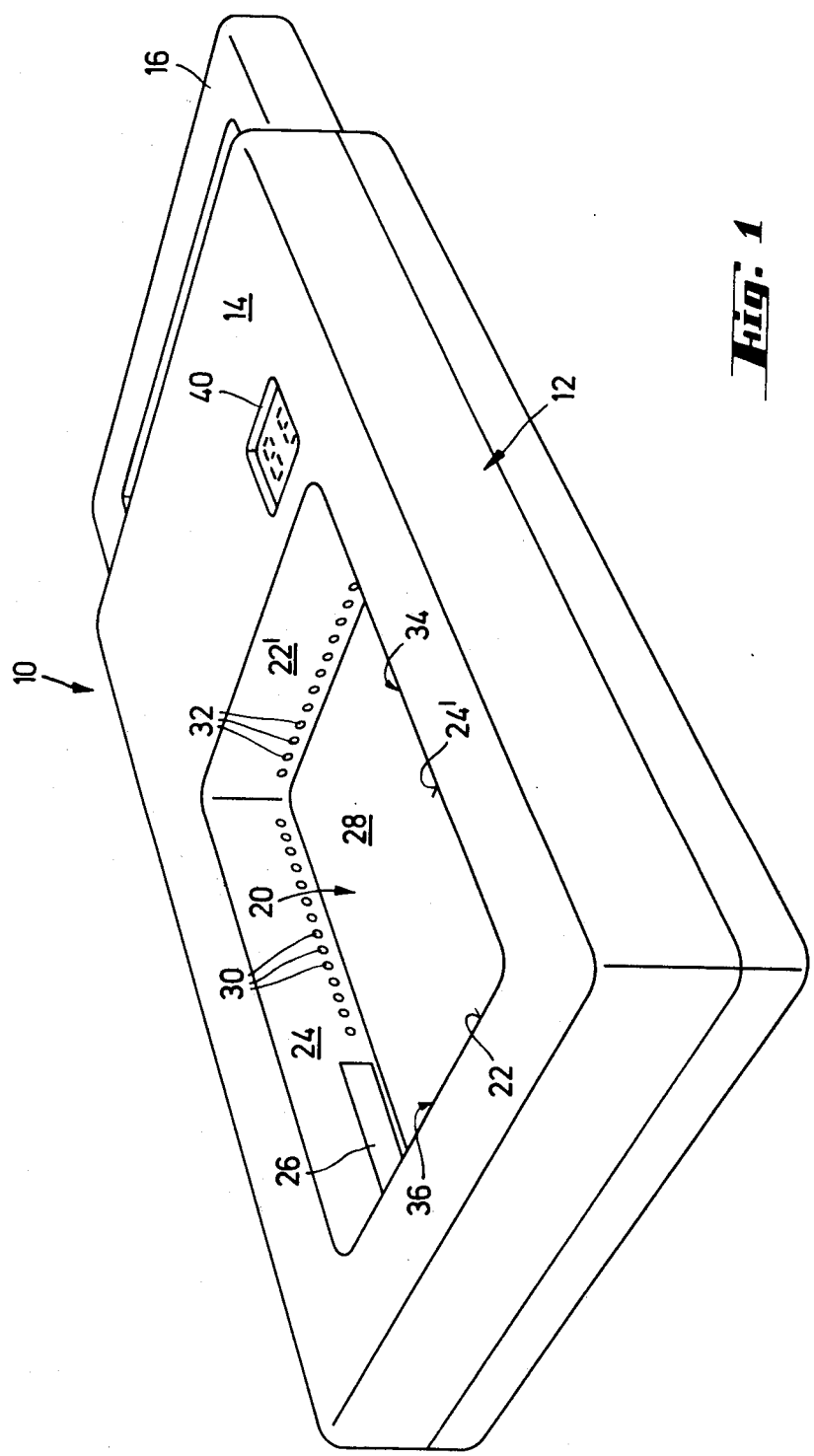
FIG. 1 shows a perspective general view of the arrangement.

According to FIG. 1, measuring device 10 has a casing 12 in the form of a flat cuboid. At one end of the casing is provided a carrying handle 16 extending over the entire length of the end wall for convenient transportation of measuring device 10. Mesuring device 10 is a line-independent and equipped with a battery for its energy supply. The represented form of measuring device 10 ensures minimum space requirement and easy stackability for storage.

In upper casing wall 14 is provided a foot holding area 20 as a depression, open at the top, in the form of a flat cuboid. Two adjacent vertical walls of foot holding area 20, namely rear wall 22 and side wall 24 serve as right-angled bearing surfaces for the foot. A heel key provided in rear wall 22 and a side key 26 provided in the side wall serve as an on-off switch of measuring device 10. This ensures, on the one hand, an energy saving operation of the device by automatic on-and off switching. On the other hand, it ensures that measuring device 10 responds only when the foot is in exact position in foot holding area 20. In side wall 24, that is, the wall on which the foot bears, are arranged phototransistors 30 as basic elements of a first transmitting and receiving unit extending in the longitudinal direction of the foot at the receiver end. The phototransistors 30 extend in a straight line parallel to footboard 28 of foot-holding area 20. The spacing between adjacent ones of phototransistors 30 corresponds to the difference between successive shoe length values or measuring raster points. In side wall 24' are arranged light-emitting diodes 34 each in alignment with a respective one of phototransistors 30. Accordingly, an equal number of basic elements are arranged inside walls 24 and 24' which have the same distance from each other. Two opposite basic elements each form a pair of basic elements and establish a measuring channel. In end wall 22' of foot holding area 20 are likewise arranged phototransistors 32, which serve as basic elements of a second transmitting and receiving unit at the receiver end for measuring the foot width. Opposite phototransistors 32, corresponding light-emitting diodes are arranged in rear wall 22.

A visual display 40 inserted in upper casing wall 14 is connected over switching elements to be described below with the outputs of phototransistors 30 and 32. It indicates the shoe size in dependence on the length and width of the foot. An indication of the shoe size in dependence of the length and width of the foot is particularly important for children's feet, since an excessively tight shoe can lead to permanent damage to the soft bone tissue. Particularly the measurement of the foot width was found difficult in children's feet because of the narrow intervals of the required basic elements, at least when good measuring accuracy is desired. But measuring of the width is now possible with sufficient accuracy according to the teaching of the invention.

Figure 2:
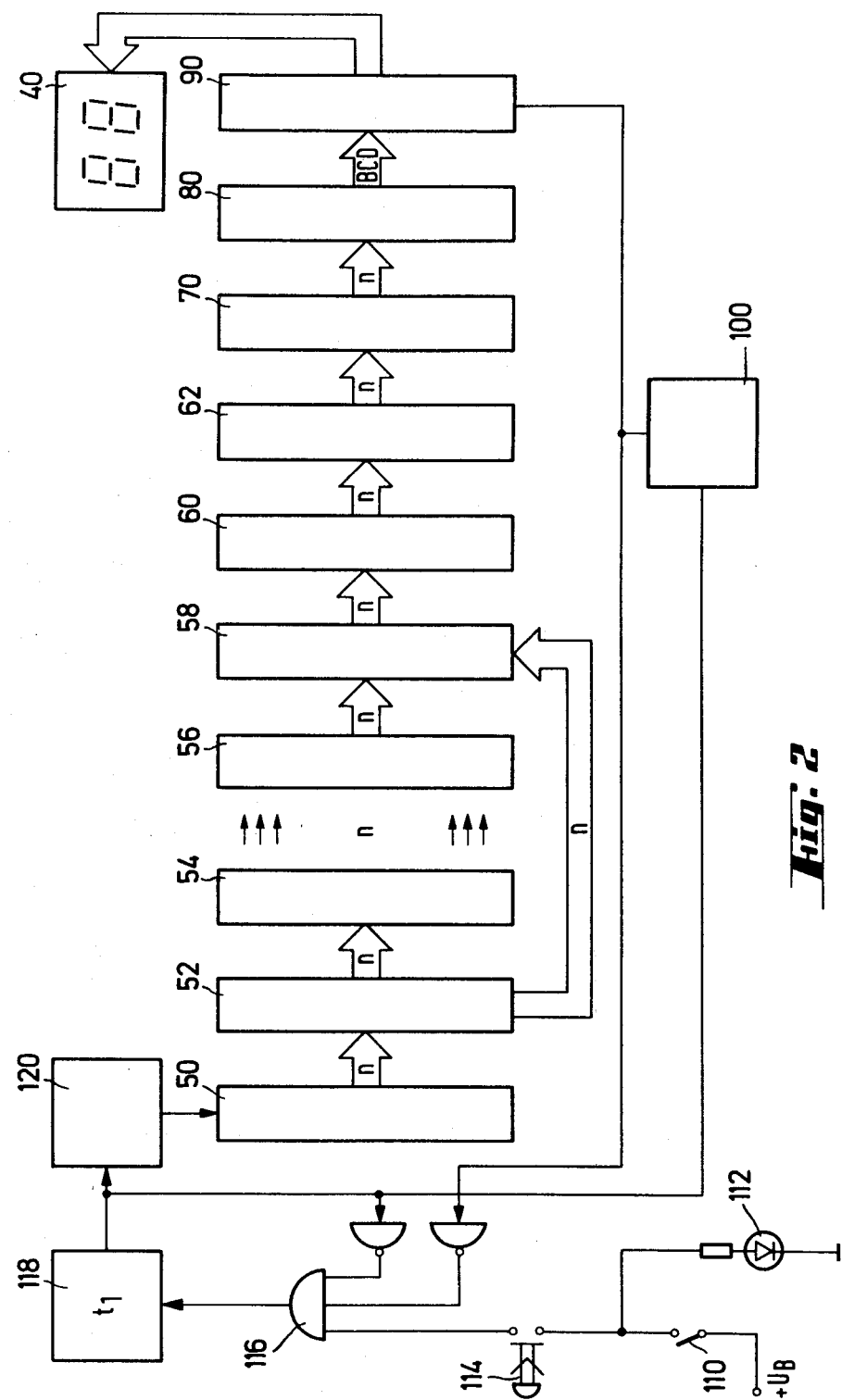
FIG. 2 shows a schematic block circuit diagram of an embodiment for operation with modulated light.

FIG. 2 shows the block circuit diagram of a first embodiment for measuring device 10. Here each individual channel for the length and width measurement consists substantially of an oscillator 50, a pulse shaper 52, a basic element 54 at the transmitter end, for example, light-emitting diode 34, a basic element 56 at the receiver end, e.g., phototransistor 30, a comparator 58, an integrator 60, and a threshold switch 62. All channels top a common electronic evaluation system, which comprises EXCLUSIVE OR gate 70, a matrix circuit 80, for example, a diode matrix or a storage matrix, a BCD-7-segment-decoder-driver stage 90, and at the end visual display 40.

Figure 3:
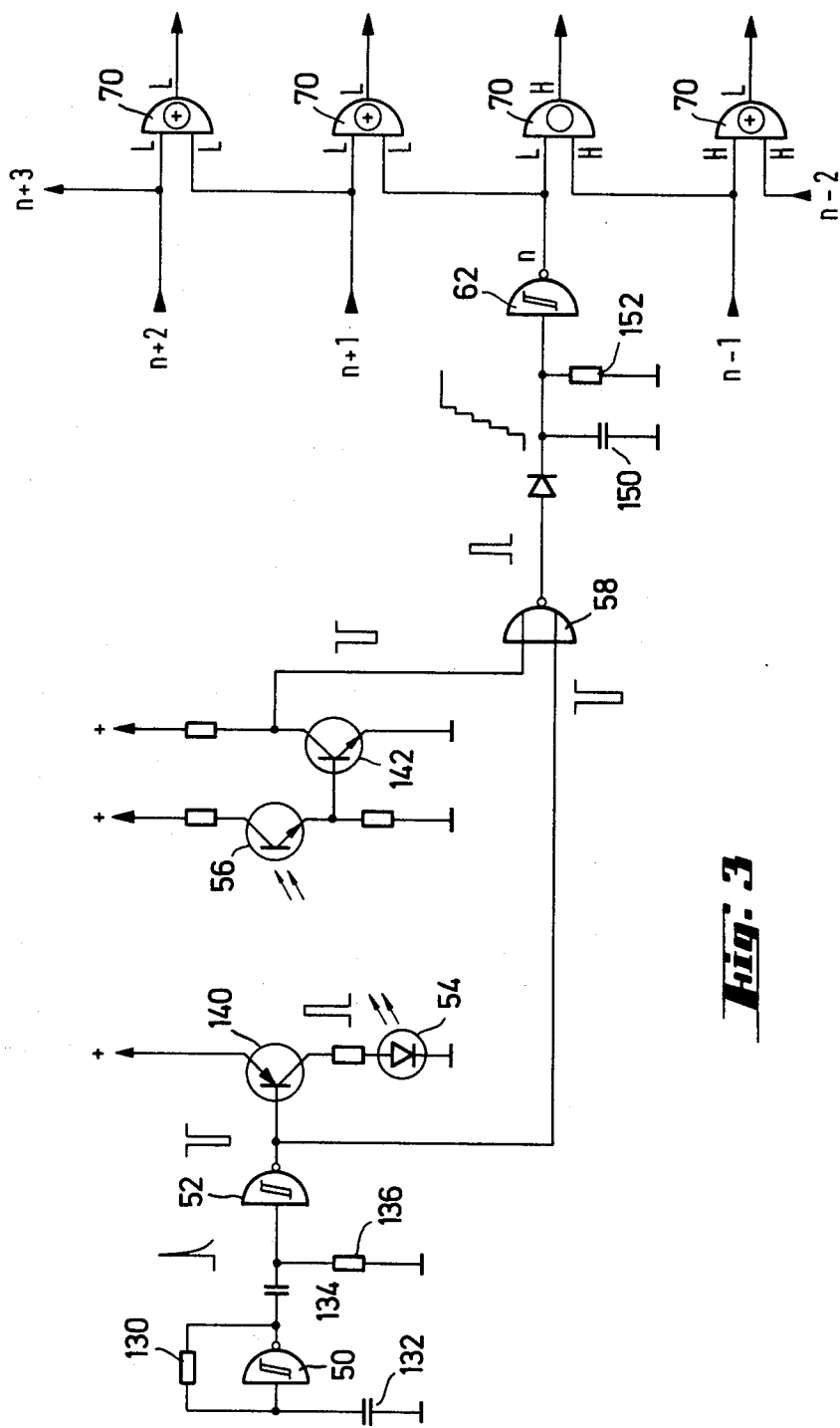
FIG. 3 shows a logic schematic circuit diagram for a single measuring channel according to FIG. 2, determined by a pair of basic elements.

The evaluation of the channels determining the length and width is effected by assigning to each channel an EXCLUSIVE OR gate 70 (FIG. 3). The matrix circuit 80 translates the evaluated signal into the respective shoe size of shoe width in the BCD code. Responsive to the signal of an indicator control 100, the following BCD 7 segment-decoder-driver stage controls the 7-segment representation of the visual display 40 for the shoe size, in dependence on the shoe length and width.

Since measuring device 10 is to be operated with batteries, the following control circuit is provided for the energy subsystem.

With proper insertion of the foot into foot holding area 20, the measuring device is supplied with voltage over a switch at the heel, side key 26, and switch on footboard 28. All three switches are represented in FIG. 2 as operating switch 110. A light-emitting diode 112 indicates that the measuring device is ready. Operating switch 110 is followed serially by a start key 114. When start key 114 is actuated, a timing circuit 118 is triggered over switch gate 116 which supplies the various channels with operating voltage over a switch unit 120. At the same time, switch gate 116 is blocked to avoid further triggering errors. After time t given by timing circuit 118 has elapsed, for the clear evaluation of the channels, the measuring results are read over the indicator control into the input store of the BCD-7-segment-decoder-driver stage, and visual control 40 is triggered at the same time. Indicator control 100 determines over a time constant $t_2$ the time during which the 7-segment-visual display 40 lights up. At the same time, it prevents the release of additional start orders over switch gate 116.

The design of the individual measuring channels for measuring the length and width is identical; a common oscillator can be provided for all channels, or a separate oscillator for each channel.

In the represented embodiment, a total of n pairs of basic elements are provided for measuring the length and width of a foot. They follow the common switch unit 120 and precede the common electronic evaluation system, with the n EXCLUSIVE OR gate 70, matrix circuit 80, BCD-7-segment decoder-driver stage 90 and visual display 40. In the direction of signal flow, each measuring channel includes an oscillator 50, pulse shaper 52, a light-emitting diode 54, a phototransistor 56, a comparator 58, an integrator 60, and a threshold switch 62, the light barrier being formed between light-emitting diode 54 and phototransistor 56, and comparator 58 having one input connected to the output of phototransistor 56, and its other input to the output of pulse shaper 52.

FIG. 3 shows the principal circuit diagram of a single channel. Oscillator 50 generates a rectangular signal, the frequency of which is determined by resistor 130 and capacitor 132. The rectangular signal produced by oscillator 50 is differentiated by a differential stage to a positive pulse. The differential stage has a capacitor 134 connected to the oscillator output, which is connected to chassis through a resistor 136. Pulse shaper 52 follows the differential stage and is triggered by the latter. It generates a very short negative pulse, compared to the duration of the oscillator pulses. The output of pulse shaper 52 is connected directly to the base of a switching transistor 140 and is likewise connected directly to one input of comparator 58 designed as a NOR gate. The emitter of switching transistor 140 has a positive potential. The collector is connected through a resistor to basic element 54 at the transmitter end, designed as a light-emitting diode. The light-emitting diode radiates light to the base of phototransistor 56 designed as a basic element at the receiver end. This controls the transmission behavior of phototransistor 56. A transistor 142 following phototransistor 56 amplifies the signal of phototransistor 56 emitted at the emitter end. The base of transistors 142 is connected to the emitter of phototransistor 56. The collectors of transistors 56 and 142 have each positive potential through a resistor; the emitters are connected to chassis. A working resistor is connected in phototransistor 56 between chassis and the connecting point to the base of transistor 142. The collector of transistor 142 is connected to the second input of comparator 58 designed as a NOR gate. The resistor connected between the collector of transistor 142 and the positive potential acts here as a working resistor. Accordingly, the signals emitted by pulse shaper 52 arrive, on the one hand, directly in comparator 58 designed as a NOR gate, and on the other hand, over light-emitting diode 54 and phototransistor 56 indirectly in comparator 58.

If the light barrier formed between light-emitting diode 54 and phototransistor 56 is not interrupted, negative pulses appear simultaneously at both inputs of comparator 58 at the frequency of the oscillator so that positive pulses are emitted at its output at the frequency of the oscillator. If there is no signal on at least one of the two inputs, no signal is emitted by comparator 58. The pulses emitted by comparator 58 are integrated in the following integrator 60 to a staircase voltage, which crosses the trigger threshold of the following threshold switch, designed as a Schmitt trigger, in the course of several successive pulses. Integrator 60 includes a capacitor 150 and a resistor 152 connected in parallel to capacitor 150. One terminal of capacitor 150 and of resistor 152 is connected to chassis, the other terminals are connected through a diode to the output of comparator 58. Resistor 152 is of such a value that the integrator crosses the trigger threshold only when all pulses given off by the pulse shaper during a measurement are fed to it. This measure results in the suppression of interfering influences. The output of threshold switch 62 assumes zero potential when its input crosses the trigger threshold, which arrives in the following EXCLUSIVE OR gates 70.

The EXCLUSIVE OR gates 70 are connected to threshold switch 62 so that the output of each threshold switch 62 controls one input of two different EXCLUSIVE OR gates, and the other two inputs of the EXCLUSIVE OR gates are controlled by the threshold switches at either side of the threshold switch.

If we assume that channel n represented in FIG. 3 is the first channel whose light barrier is not interrupted by the measured object, that is, the foot, we find the following constellation on the EXCLUSIVE OR gates. All channels under it (n−1, n−2, etc.) whose light barriers are interrupted by the foot, have positive potential at the output of their threshold switches 62 or Schmitt triggers. Consequently, the two following EXCLUSIVE OR gates 70 likewise have a positive potential. The outputs of these elements thus have zero potential. All channels above it, n+1, n+2, etc. have zero potential at the output of their Schmitt triggers, which appears at the two inputs of the respective EXCLUSIVE OR gates. Their outputs thus likewise have zero potential. Only the EXCLUSIVE OR gate 70 of the measuring channel represented here—hence the first channel whose light barrier is not interrupted—has a different potential at the two inputs, and thus positive potential at the output. This output signal is coded and in the following matrix circuit 80 designed as a diode matrix in the BCD code of the respective shoe length and width further processed.

The pulses of the neighboring channels likewise received by the basic element or phototransistor 56 at the transmitter end remain ineffective since they can not pass through comparator 58, namely the NOR gate. Occasional pulses, which are equally positioned by harmonics or interferences, and which can not pass through comparator 58, remain likewise ineffective, since they are not sufficient to raise the potential of integrator 60 above the trigger threshold of the Schmitt trigger.

FIG. 4 shows the block circuit diagram of the measuring arrangement in pure time multiplex operation, where the transmitting and receiving units for the measurement of the foot length and width are topped by a common clock oscillator 160. Through a counter 162, clock oscillator 160 successively clocks the individual channels for measuring the foot length assigned to the pairs of basic elements. The measuring channels provided for the measurement of the foot width, which are correlated with the basic elements in a one-to-one relationship, are likewise clocked successively by an identical counter.

By proper insertion of the foot in foot holding area 20, measuring device 10 is supplied with operating voltage over operating switch 110. Light-emitting diode 112 indicates readiness. When start key 114 is actuated, counter 112 is started over a switch gate 119. Counter 112 counts the clock pulses of clock oscillator 160. Each individual output 1 to n of counter 162 controls one of the n measuring channels or light barriers, which consist substantially of the basic element at the transmitter end in the form of a light-emitting diode 164, the basic element at the receiver end in the form of a photo-transistor 166, and of a comparator stage 168. Owing to the one-to-one correlation between the counter outputs and the light-emitting diodes 164, the measuring channels are put into service successively in the order of the counter outputs, namely from the smallest to the largest shoe length or shoe width. This ensures that only one pair of basic elements is activated for the measurement of a shoe dimension, while the others remain out of service. The comparison between light-emitting diode 164 and phototransistor 166 is made in time multiplex operation by providing both with supply voltage only at the time of operation of this light barrier by the respective counter output.

According to FIG. 5, a particularly simple circuit for the formation of the light barriers is possible in time multiplex operation. According to FIG. 5, each counter output controls a switching transistor 163 whose control output is connected at the same time to the positive terminals of the light-emitting diode 164 and to the collector of the NPN-photo-transistor 166. The radiation given off by light-emitting diode 164 falls on the base of phototransistor 166 and controls the latter. The emitter of phototransistor 166 is connected to chassis through a working resistor. The signal obtained by this circuit is fed to a n-stage OR element 170. Each input of the n-stage OR element 170 is connected to a phototransistor 166.

In the first light barrier not interrupted by the foot, a positive signal is generated on the emitter of photo-transistor 166. This signal arrives over n-stage OR gate 170 in an indicator control 101. At the same time the signal emitted by the emitter arrives in a switch gate 119. Switch gate 119 stops counter 162 in this position. The counter output corresponding to this counter position is translated in matrix circuit 80, designed as a diode matrix, into the BCD code. The last mentioned signal flow is represented by a thick arrow. Indicator control 101 triggered by OR gate 170 produces a control signal to BCD-7-segment-decoder-driver-stage 90. The signal translated into the BCD code by the diode matrix of the counter outputs is thus read into the input store of the BCD-7-segment-decoder-driver stage. At the same time, visual display 40 lights up for the duration of time t3 given by indicator control 101 and indicates the shoe size in dependence on the measured foot length and width.

During this time, switch gate 119 is blocked for other start releases. Only after visual display 40 is extinguished does indicator control 101 set the two counters 162 back to zero. Then measuring device 10 can be started again.

Figure 7:
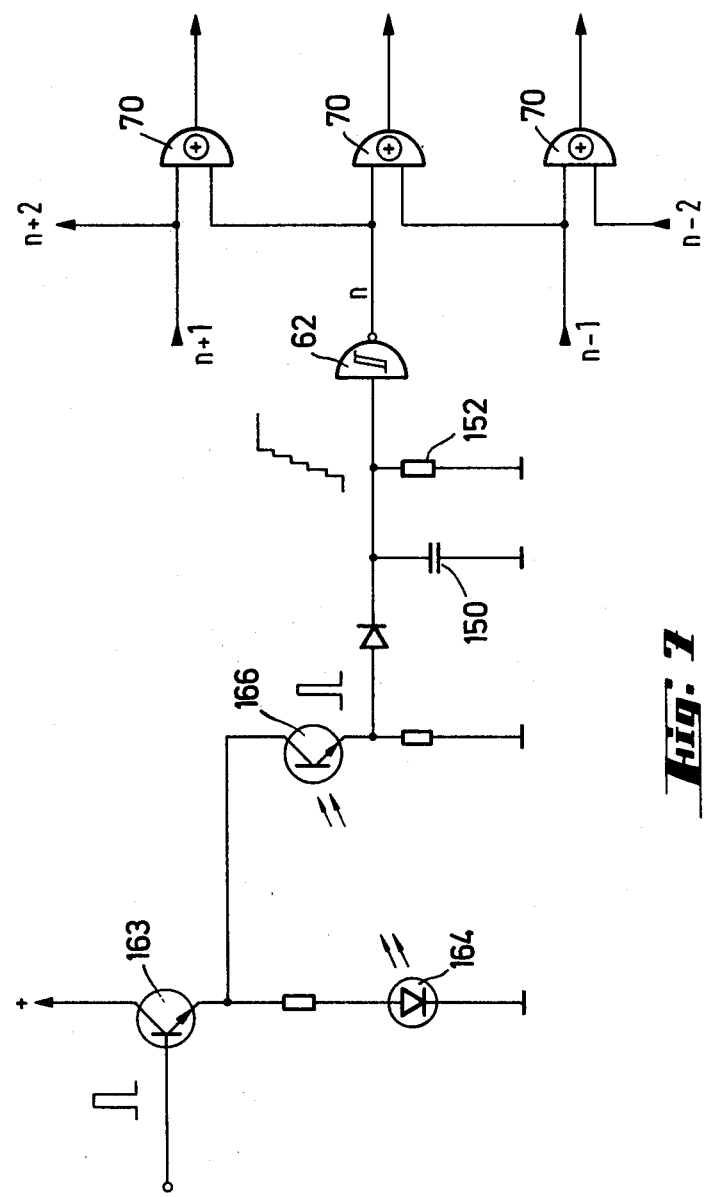
FIG. 7 shows a schematic circuit diagram of an individual measuring channel according to FIG. 6 determined by a pair of basic elements.

The embodiment of an "integrating time multiplex operation" represented in FIGS. 6 and 7 combines the advantages of a pure multiplex operation regarding the sharp channel separation with the advantages of modulated signals regarding the susceptibility to troubles, particularly the separation of interference pulses, incident outside light, and diffraction related disturbance variables.

FIG. 6 shows the block circuit diagram of the embodiment for a measuring arrangement with integrating time multiplex operation. The trigger circuit used in this embodiment is identical with the energy-saving trigger circuit already described for pure modulation operation, with the exception that timing circuit 117 does not control the individual frequency determining oscillators 50 shown in FIG. 2, but only a single clock oscillator 180. This clock oscillator 180 allows a counter 162 to pass completely through its full count several times during a time $t_1$ given by timing circuit 117. During time $t_1$ counter 162' drives the various light barriers continuously and successively through its outputs in the same manner as already described with reference to the simple pure time multiplex operation. Here too, the light barriers are formed between a basic element 164 at the transmitter end and a basic element 166 at the receiver end. The two basic elements are again realized by a light-emitting diode 164 and a phototransistor 166. These two basic elements are wired with each other in the same manner as in the embodiment represented in FIG. 5.

Compared to the pure time multiplex operation, comparator 168 is followed in integrating time multiplex operation in each channel by the following elements in the indicated order: an integrator 60 and a threshold switch 62. Integrator 60 and threshold switch 62 are designed in the same manner as in pure modulation operation. This circuit was described with reference to the embodiments represented in FIGS. 2 and 3. This becomes particularly clear by a comparison of the principal circuit diagram shown in FIG. 7 for a single channel n with the principal circuit diagram shown in FIG. 3. Accordingly, the output pulses of phototransistor 166 are integrated in this embodiment too by means of integrator 60, composed of capacitor 150 and resistor 152, into a staircase voltage which crosses the trigger threshold of the following Schmitt trigger 62 after several pulses.

The subsequent common electronic evaluation system assigned to the n channels for measuring length and width is likewise identical with the electronic evaluation system shown in FIGS. 2 and 3. It is therefore not described again.

We claim:

1. In an apparatus for determining the shoe size corresponding to a foot, said apparatus being of the type having a foot holding device, at least one transmitting unit which radiates spatially bunched signals to a receiving unit opposite the foot holding device, the transmitting unit being subdivided into radiating basic elements and the receiving unit into basic elements responding to the signals, pairs of respective radiating and responding basic elements being in opposed, spaced relationship with basic elements of the same type being arranged side by side in the direction of successive, spaced measuring raster points, the improvement comprising:
   the extension of said basic elements in the direction of successive measuring raster points being no greater than the spacing of adjacent measuring raster points; and
   at least within adjacent pairs of basic elements, the two basic elements defining each of said pairs being in one to one correlation with each other regarding the signals to be transmitted.

2. Apparatus according to claim 1, wherein the basic elements at the transmitting unit have radiation-emitting diodes and the basic elements at the receiving unit have photo-transistors.

3. Apparatus according to claim 1, wherein the basic elements at the transmitting unit have radiation-emitting diodes.

4. Apparatus according to claim 1, wherein the basic elements at the receiving unit have phototransistors.

5. Apparatus according to claim 2, further comprising a square wave oscillator at the transmitting unit, a pulse shaper, a differential element between the square wave oscillator and the pulse shaper, and a switching transistor between the pulse shaper and the light-emitting diode.

6. Apparatus according to any one of claims 1–4 wherein a first transmitting and receiving unit extend in the lengthwise direction of a foot to be measured and a second transmitting and receiving unit extend in the lateral direction thereof, the second transmitting and receiving unit extending at least over double the length of the width measuring raster associated with a foot.

7. Apparatus according to claim 6, wherein the first and second receiving units are followed by a common matrix circuit having a line control input connected to the outputs of the basic elements of one receiving unit and a column control input connected to the outputs of the basic elements of the other receiving unit, said matrix circuit being one of a diode matrix and a storage matrix.

8. Apparatus according to any one of claims 1–4 wherein a first transmitting and receiving unit extend in the lengthwise direction of a foot to be measured.

9. Apparatus according to any one of claims 1–4 wherein a second transmitting and receiving unit extend in the lateral direction thereof, the second transmitting and receiving unit extending at least over double the length of the width measuring raster associated with a foot.

10. Apparatus according to any one of claims 1–4 further comprising a visual display to which the outputs of the basic elements at the receiving unit are coupled and a device for converting the output signals of the basic elements to shoe sizes, said device being connected between the visual display and the outputs of the basic elements at the receiving unit and including a BCD converter.

11. Apparatus according to claim 10, wherein the first and second receiving units are followed by a common matrix circuit having a line control input connected to the outputs of the basic elements of one receiving unit and a column control input connected to the outputs of the basic elements of the other receiving unit, said matrix circuit being one of a diode matrix and a storage matrix.

12. Apparatus according to any one of claims 1–4, wherein at least one transmitting unit and an associated receiving unit each have several basic elements arranged side by side in a row.

13. Apparatus according to any one of claims 1–4, wherein the spacing between the basic elements of a first transmitting and receiving unit are equal to the spacing of the corresponding shoe size measuring raster points, and the spacing of the basic elements of a second transmitting and receiving unit are equal to the spacing of the corresponding shoe size measuring raster points.

14. Apparatus according to any one of claims 1–4, wherein at least adjacent pairs of basic elements have different modulation of the radiation transmitted between them.

15. Apparatus according to any one of claims 1–4, further comprising time multiplexer means for clocking at least adjacent pairs of basic elements at different times.

16. Apparatus according to claim 15, further comprising a clock oscillator, a subsequent counter with at least two outputs control inputs for each said pair of basic elements being coupled to the same counter output, the control inputs of adjacent pairs of basic elements being connected to different counter outputs, whereby the counter outputs are in one-to-one correlation with the pairs of basic elements.

17. Apparatus according to any of claims 1-4, further comprising a pair of filters coupled to each pair of basic elements, the pair of filters being particularly a pair of modulation filters.

18. Apparatus according to claim 17, wherein a pair of modulation filters has a pulse shaper preceding the basic element at the transmitting unit, and an oscillator preceding the pulse shaper and each pair of modulation filters has a two input comparator following the basic element at the receiving unit, one comparator input being connected to the output of the basic element and the other computer input being connected to the output of the pulse shaper.

19. Apparatus according to claim 18, further comprising a square wave oscillator at the transmitting unit, a pulse shaper, a differential element between the square wave oscillator and the pulse shaper, and a switching transistor between the pulse shaper and the light-emitting diode.

20. Apparatus according to claim 18, wherein the comparator is a NOR gate and the threshold switch a Schmitt trigger.

21. Apparatus according to claim 18, wherein a pair of modulation filters has a pulse shaper preceding the basic element at the transmitting unit, and an oscillator preceding the pulse shaper.

22. Apparatus according to claim 18, wherein each pair of modulation filters has a two input comparator following the basic element at the receiving unit, one comparator input being connected to the output of the basic element and the other computer input being connected to the output of the pulse shaper.

23. Apparatus according to any one of claims 1-4, wherein each basic element at the receiving unit is followed by two input EXCLUSIVE OR gates, the basic element being coupled to one input of each EXCLUSIVE OR gate and the other input of each EXCLUSIVE OR gate being coupled to basic elements arranged on either side of said each basic element.

24. Apparatus according to claim 23 wherein each EXCLUSIVE OR gate is preceded by a threshold switch which is preceded by an integrator.

25. Apparatus according to claim 23, further comprising a source of pulses at a predetermined frequency, time switch means for limiting the number of pulses transmitted from the pulse per foot measurement to a given finite integral number exceeding 2, an integrator and a resistor connected in parallel to the integrator whose resistance value is so selected that the integrator emits a signal exceeding a predefined threshold value only when it receives the given number of pulses.

26. Apparatus according to claim 25, further comprising a square wave oscillator at the transmitting unit, a pulse shaper, a differential element between the square wave oscillator and the pulse shaper, and a switching transistor between the pulse shaper and the light-emitting diode.

27. Apparatus according to claim 25, further comprising a matrix circuit having respective line and column control inputs, the outputs of the EXCLUSIVE OR gates being connected to the line and column control inputs of the matrix circuit.

28. Apparatus according to claim 23, further comprising a matrix circuit having respective line and column control inputs, the outputs of the EXCLUSIVE OR gates being connected to the line and column control inputs of the matrix circuit.

29. Apparatus according to claim 28, further comprising a clock oscillator, a subsequent counter with at least two outputs control inputs for each said pair of basic elements being coupled to the same counter output, the control inputs of adjacent pairs of basic elements being connected to different counter outputs, whereby the counter outputs are in one-to-one correlation with the pairs of basic elements.

30. Apparatus according to claim 23, further comprising a square wave oscillator at the transmitting unit, a pulse shaper, a differential element between the square wave oscillator and the pulse shaper, and a switching transistor between the pulse shaper and the light-emitting diode.

31. Apparatus according to claim 23, further comprising a clock oscillator, a subsequent counter with at least two outputs control inputs for each said pair of basic elements being coupled to the same counter output, the control inputs of adjacent pairs of basic elements being connected to different counter outputs, whereby the counter outputs are in one-to-one correlation with the pairs of basic elements.

32. Apparatus according to any of claims 1-4, further comprising a clock oscillator, a subsequent counter with at least two outputs control inputs for each said pair of basic elements being coupled to the same counter output, the control inputs of adjacent pairs of basic elements being connected to different counter outputs, whereby the counter outputs are in one-to-one correlation with the pairs of basic elements.

33. Apparatus according to claim 32, further comprising a matrix circuit having line and column control inputs, the counter outputs of the first transmitting and receiving unit being coupled to said line control input, the counter outputs of the second transmitting and receiving unit being coupled to said column control input and means for marking those outputs which are associated with determined shoe size values provided for each counter.

34. Apparatus according to claim 32 having n pairs of basic elements, which are clocked in the direction of rising measuring raster points and further comprising means for marking the counter outputs having a n stage OR element coupled to the n basic elements at the receiving unit, and a switch gate coupling the marking means to the counter.

35. Arrangement according to any one of claims 1-4, further comprising a portable casing and a line independent layout, the casing having the form of a flat cuboid.

36. Arrangement according to claim 35, further comprising a foot holding device designed as an open cuboid depression in the casing.

37. Arrangement according to claim 36, further comprising visual display means, said casing having an upper wall, wherein said display means is mounted.

38. Arrangement according to claim 35, further comprising visual display means, said casing having an upper wall, wherein said display means is mounted.

* * * * *